United States Patent [19]

Hoehl et al.

[11] 3,780,849

[45] Dec. 25, 1973

[54] APPARATUS AND METHOD FOR ARRANGING FLAT ARTICLES ON A TROUGH CONVEYOR

[75] Inventors: Bernhard Hoehl, Litzelstetten; Karl-Heinz Kummerer, Constance, both of Germany

[73] Assignee: Licentia Patent-Verwaltungs-G.m.b.H., Frankfurt am Main, Germany

[22] Filed: May 8, 1972

[21] Appl. No.: 251,222

Related U.S. Application Data

[63] Continuation of Ser. No. 67,931, Aug. 28, 1971, abandoned.

[30] Foreign Application Priority Data

Aug. 30, 1969 Germany................... P 19 44 180.6

[52] U.S. Cl................ 198/30, 198/33 AA, 198/44, 214/1 M
[51] Int. Cl.............................................. B65g 47/26
[58] Field of Search................... 198/33 AA, 30, 47, 198/161, 165, 50, 57, 51, 44, 66, 67, DIG. 16; 271/45; 214/1 M

[56] References Cited
UNITED STATES PATENTS

| | | | |
|---|---|---|---|
| 2,738,051 | 3/1956 | Beyer | 198/34 |
| 278,402 | 5/1883 | Coleman | 198/161 X |
| 146,877 | 1/1874 | Craven | 198/161 |
| 3,347,348 | 10/1967 | Flint et al. | 198/165 X |
| 3,227,263 | 1/1966 | Kastenbein | 198/161 |

FOREIGN PATENTS OR APPLICATIONS

| | | | |
|---|---|---|---|
| 512,940 | 11/1930 | Germany | 198/161 |

*Primary Examiner*—Evon C. Blunk
*Assistant Examiner*—H. S. Lane
*Attorney*—Spencer & Kaye

[57] ABSTRACT

A funnel arrangement for delivering a uniform flow of flat articles to a trough conveyor, the funnel being arranged over the trough conveyor and two of the side walls of the funnel being parallel to the direction of movement of the trough conveyor, one side wall being constituted by an upwardly moving reach of a conveyor belt and at least part of the other side wall being formed by a conveying means opposite the lower part of the conveyor belt, the conveying means and the conveyor belt cooperating to form a slit-shaped outlet opening in the bottom of the funnel through which the flat articles are directed downwardly by the conveying means onto the trough conveyor in a substantially uniform manner.

9 Claims, 5 Drawing Figures

PATENTED DEC 25 1973　　　　　3,780,849
Fig. 1
Fig. 2
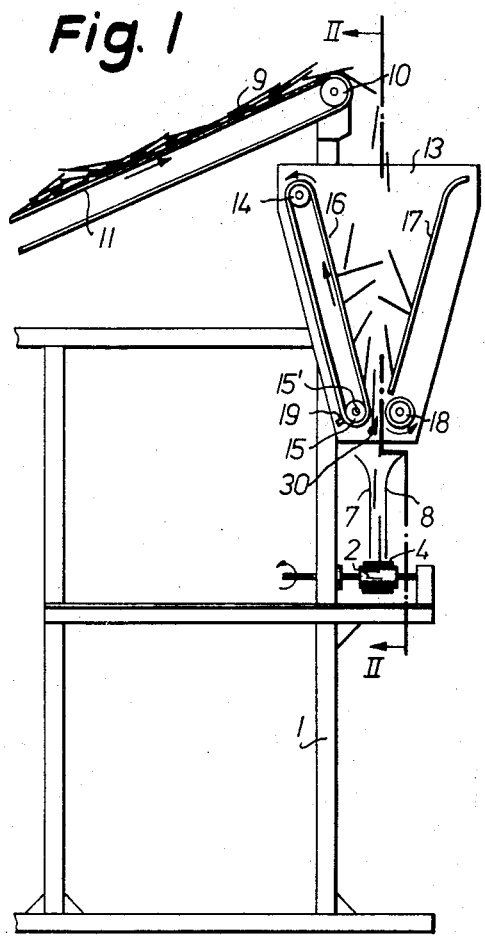
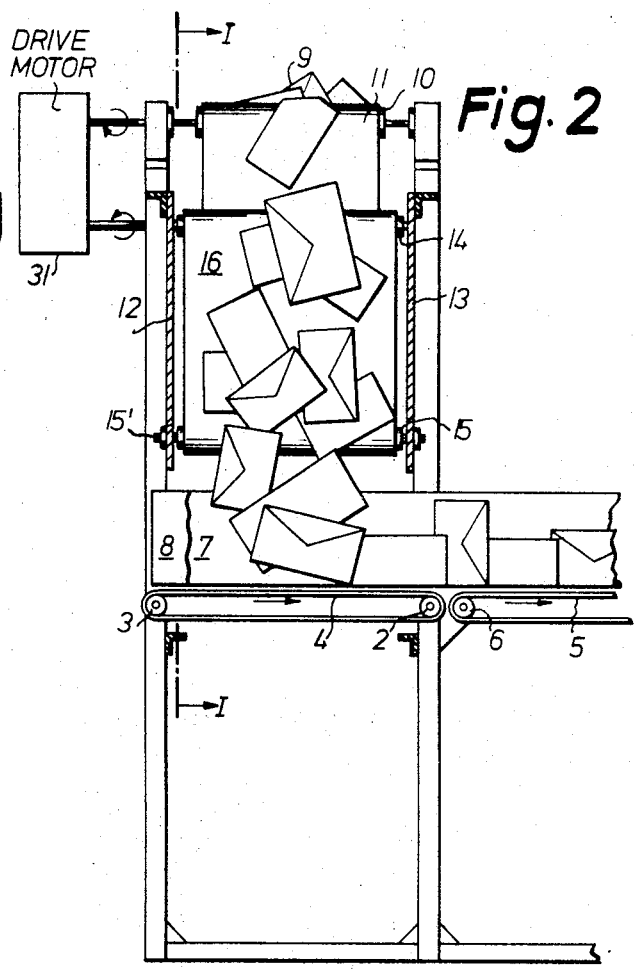
Fig. 3a
Fig. 3b
Fig. 4
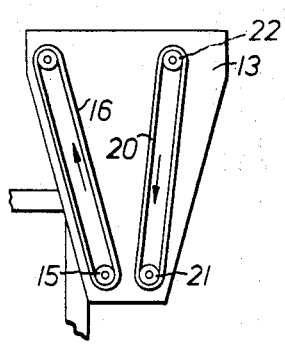
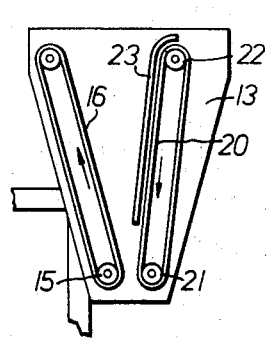
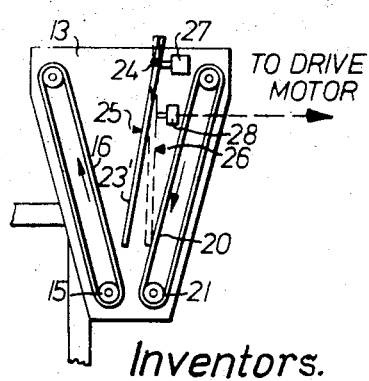
Inventors.
Bernhard Hoehl
Karl-Heinz Kummerer
BY Spencer & Kaye
ATTORNEYS.

3,780,849

APPARATUS AND METHOD FOR ARRANGING FLAT ARTICLES ON A TROUGH CONVEYOR

CROSS REFERENCE TO RELATED APPLICATION

This application is a continuation of Application Ser. No. 67,931, filed Aug. 28th, 1970.

BACKGROUND OF THE INVENTION

There often exists in systems for processing mail shipments to automatically distribute the mail the problem of feeding the arriving mail shipments into a trough conveyor, which conveys them in an on-edge position, in such a manner that this trough is charged as uniformly as possible. The conveying trough then passes over an alignment section where the shipments are aligned in the direction of their long edges.

In a device disclosed in U. S. Pat. No. 2,905,309, issued Sept. 22, 1959 to G. Makrides, for solving this problem the mail items, which lie flat on a conveying belt, are put onto a slide which has a convex curvature, and which opens from the top into the trough conveyor.

It has been found that it will happen, in devices of this type, that the mail shipments often arrive in irregular accumulations. At such times, malfunctions will occur when a slide or similar conveying element is used. The items which will either be jammed together at the entrance of the trough conveyor or the accumulations passing thereinto are so heavy that in the subsequent alignment section the shipments can no longer be aligned.

SUMMARY OF THE INVENTION

It is an object of the present invention to avoid the above-mentioned problems in an apparatus of the above-mentioned type. For this purpose, the device according to the present invention is provided with a substantially perpendicularly disposed wedge-shaped funnel in which one of two side walls which are disposed parallel with the conveying direction of a trough conveyor is formed by an upwardly moving conveyor belt; a conveying means being disposed at the slit-shaped outlet opening of this funnel, which outlet is disposed above the trough conveyor, and arranged opposite the lower guide roller of the upwardly moving conveyor belt and moving in a downward direction. The method of the present invention involves the steps of feeding irregular accumulations of flat articles in the wedge-shaped funnel, storing the accumulated articles in the funnel by means of the conveyor belt, and directing the articles out through the slit-shaped outlet in a substantially uniform manner so that they will fall onto the trough conveyor at substantially regular intervals on one of their edges.

BRIEF DESCRIPTION OF THE DRAWINGS

FIG. 1 is a schematic, cross-sectional side elevation view of a first embodiment of a device according to the present invention taken generally along the line I—I of FIG. 2.

FIG. 2 is a schematic, cross-sectional, front elevation view taken generally along line II—II of FIG. 1.

FIGS. 3a and 3b are schematic side elevation views of a portion of second and third embodiments, respectively, according to the present invention.

FIG. 4 is a schematic side elevation view similar to FIG. 3 of a fourth embodiment according to the present invention.

DESCRIPTION OF THE PREFERRED EMBODIMENTS

FIGS. 1 and 2 show a first embodiment of the invention in which a trough conveyor is disposed on a schematically illustrated machine stand 1, the conveyor including a flat conveyor belt 4 guided around rollers 2 and 3 (FIG. 2) and another flat conveyor belt 5 subsequent thereto having a guide roller 6, as well as two lateral guide walls 7 and 8. In FIG. 2, guide wall 8 has been partially removed. A flat conveyor belt 11 is provided to feed-in flat articles 9, such as mail shipments, and is brought about guide roller 10.

The trough conveyor is loaded in the sense of the present invention by means of a substantially perpendicularly disposed wedge-shaped funnel, whose slit-shaped outlet opening 30 is disposed above the trough conveyor. In the embodiment shown in FIGS. 1 and 2, the two parallel disposed walls 12 and 13 of the funnel are fastened to the machine stand 1. Of the two side walls disposed parallel with the conveying direction of the on-edge conveying trough, which walls form an acute angle between themselves, one is constituted by the upwardly moving reach of a conveyor belt 16 which is guided by rollers 14 and 15, the other by a plate 17.

A downwardly moving conveying means is also disposed at the slit-shaped outlet opening 30 of the funnel, and is arranged opposite the lower guide roller 15 for movement in a downward direction. In FIG. 1 this conveying means is a roller 18.

The belts 11 and 16 and roller 18 may be rotated by any well known means, such as an electric motor 31 provided with suitable gearing. The width of the outlet opening 30 can be varied by changing the position of shaft 15' of guide roller 15 along formed slots 19 in walls 12 and 13 in accordance with the prevailing operating conditions. In a practical embodiment of the device, the above-mentioned conveying means operated at the following speeds: conveyor belt 11 at 0.1 m/s; conveyor belt 16 at 0.6 m/s; conveying roller 18 at 0.4 m/s; and flat conveyor belt 4 at 1.5 m/s.

As long as the mail items 9 are furnished in a single thickness layer by conveyor belt 11, they will fall through funnel 13 directly onto conveyor belt 4 of the trough conveyor in a substantially uniform flow and land thereon on one of their edges due to the effects of gravity. If, however, larger accumulations of mail shipments are passed into the funnel, the portion exceeding the predetermined conveying density for the trough conveyor is temporarily stored there. Due to the cooperation of the conveying belt 16, wall 17 and the downwardly effective conveying roller 18, it is accomplished that no stoppages can occur in the storage area of the funnel and that the shipments are given to the trough conveyor in an approximately uniform manner.

Second and third embodiments of the present invention as shown in FIGS. 3a and 3b, respectively, feature a conveying means which is a second conveyor belt 20 whose lower guide roller 21 is disposed opposite the lower guide roller 15 of the upwardly rotating conveyor belt 16.

FIG. 3a shows an embodiment of the present invention in which the wall of the funnel opposite the conveyor belt 16 is formed directly by conveyor belt 20.

FIG. 3b shows a variation of this principle in which this wall is formed substantially by a plate 23 which covers the upper portion of the second conveyor belt 20 from the area of the guide roller 22 down approximately to the vicinity of the lower guide roller 21.

In the fourth embodiment shown in FIG. 4, a plate 23' is disposed to be pivotal about an axis 24 so that it can move between two end positions defined by abutments 25, 26. A weight 27 is fastened to assure that the plate 23' is disposed against abutment 25 when the storage area of the funnel is empty. As soon as a certain number of items is in the funnel (as, e.g., in FIg. 1) the plate 23' is pressed into the right-hand end position which is given by abutment 26. This is shown in FIG. 3 by the dashed lines. There it then actuates a suitable, known microswitch 28 whose response may be utilized, for example, to send a signal to motor 31 to either stop conveyor belt 11 or to reduce its conveying speed. This may be accomplished in a known manner.

It will be understood that the above description of the present invention is susceptible to various modifications, changes and adaptations, and the same are intended to be comprehended within the meaning and range of equivalents of the appended claims.

We claim:

1. Apparatus for the approximately uniform loading of an upright trough conveyor with articles furnished in irregular quantities for delivery to the trough conveyor, which conveyor supports the articles on edge, comprising, in combination, guide means arranged over the trough conveyor and defining a wedge-shaped funnel with a slit-shaped outlet opening for guiding the flat articles, the funnel having two side walls parallel to the direction of movement of the trough conveyor sloping downwardly toward one another, said guide means being composed of first conveyor belt means having upper and lower guide rollers and disposed for causing one reach of said belt means to form one of said side walls of said wedge-shaped funnel, means for driving said belt means for causing said one reach to move upwardly for storing the accumulated flat articles, second conveyor belt means for forming at least a portion of said other of said side walls parallel to the direction of movement of the trough conveyor, said second conveyor belt means having upper and lower guide rollers with the lower guide roller arranged opposite to the lower guide roller of said first conveyor belt means for defining therewith the slit-shaped outlet opening of said guide means, said second conveyor belt means producing a movement in the downward direction to direct the flat articles downwardly through said opening and onto the trough conveyor in a substantially uniform manner, and a plate member arranged to cover at least the upper portion of said second conveyor belt means from a point adjacent its lower guide roller so as to form a portion of the other parallel wall of said wedge-shaped funnel in cooperation with said second conveyor belt means.

2. Apparatus as defined in claim 1, wherein said plate member is mounted for pivotal movement between two end positions, and further including signal generator means which is actuated by said pivotal plate member when said pivotal plate member is pivoted by said flat articles upon said articles reaching a predetermined level in said guide means.

3. A system of transporting flat articles, comprising, in combination:

a. an upright trough conveyor; and
b. apparatus for the approximately uniform loading of said upright trough conveyor with flat articles furnished in irregular quantities for delivery to said trough conveyor, said apparatus comprising, guide means arranged over said trough conveyor and defining a wedge-shaped funnel with a slit-shaped outlet opening located directly above said trough conveyor for guiding the flat articles, the funnel being substantially vertical and having two side walls parallel to the direction of movement of said trough conveyor sloping downwardly toward one another, said guide means being composed of first conveyor belt means having upper and lower guide rollers and disposed for causing one reach of said belt means to form one of said side walls of said wedge-shaped funnel, means for driving said belt means for causing said one reach to move upwardly for storing the accumulated flat articles, and conveying means for forming at least a portion of said other of said side walls parallel to the direction of movement of said trough conveyor and arranged at least partially opposite to the lower guide roller of said conveyor belt means for defining therewith the slit-shaped outlet opening of said guide means, said conveying means producing a movement in the downward direction to direct the flat articles downwardly through said opening and directly onto said trough conveyor in a substantially uniform manner so as to be carried away directly upon reaching said trough conveyor.

4. Apparatus for the approximately uniform loading of an upright trough conveyor with flat articles furnished in irregular quantities for delivery to the trough conveyor, which conveyor supports the articles on edge, comprising, in combination, guide means arranged over the trough conveyor and defining a wedge-shaped funnel with a slit-shaped outlet opening arranged to be directly above the trough conveyor for guiding the flat articles, the funnel being substantially vertical and having two side walls parallel to the direction of movement of the trough conveyor sloping downwardly toward one another, said guide means being composed of first conveyor belt means having upper and lower guide rollers and disposed for causing one reach of said belt means to form one of said side walls of said wedge-shaped funnel, means for driving said belt means for causing said one reach to move upwardly for storing the accumulated flat articles, and conveying means for forming at least a portion of said other of said side walls parallel to the direction of movement of the trough conveyor and arranged at least partially opposite to the lower guide roller of said conveyor belt means for defining therewith the slit-shaped outlet opening of said guide means, said conveying means producing a movement in the downward direction to direct the flat articles downwardly through said opening and directly onto the trough conveyor in a substantially uniform manner so as to be carried away directly upon reaching the trough conveyor.

5. Apparatus as defined in claim 4, wherein said conveying means is a conveyor roller.

6. Apparatus as defined in claim 4, further including a belt conveyor having a discharge end portion means arranged above said guide means for discharging irregular accumulations of flat articles into said guide means.

7. Apparatus as defined in claim 4, wherein said conveying means is a second conveyor belt means having upper and lower guide rollers, the lower guide roller of which is arranged opposite to the lower guide roller of said first conveyor belt means.

8. Apparatus as defined in claim 7, wherein said second conveyor belt means forms the entire side wall of said wedge-shaped funnel adjacent said other of said side portions parallel to the direction of movement of the trough conveyor.

9. A method for regularizing a delivery of irregular quantities of flat articles which are to be delivered to a trough conveyor at substantially uniform intervals, comprising the steps of:

a. feeding the irregular quantities of said flat articles into a substantially vertical wedge-shaped funnel having at its bottom a slit-shaped outlet opening located directly above the trough conveyor;

b. storing accumulated flat articles in the funnel by means of the upwardly moving reach of a conveyor belt arranged in the funnel; and c. feeding the flat articles out of the funnel and directly onto the trough conveyor in a substantially uniform manner downwardly through the slit-shaped outlet opening in the bottom of the funnel by means of a downwardly moving conveyor means whereupon the articles are carried away directly upon reaching the trough conveyor.

* * * * *

UNITED STATES PATENT OFFICE
CERTIFICATE OF CORRECTION

Patent No. 3,780,849     Dated December 25th, 1973

Inventor(s) Bernhard Hoehl and Karl-Heinz Kummerer

It is certified that error appears in the above-identified patent and that said Letters Patent are hereby corrected as shown below:

In the heading of the patent, line 13, change "Aug. 28,1971," to --Aug. 28, 1970,--. Column 3, line 15, change "3" to --4--.

Signed and sealed this 30th day of April 1974.

(SEAL)
Attest:

EDWARD M.FLETCHER,JR.         C. MARSHALL DANN
Attesting Officer              Commissioner of Patents